Nov. 5, 1935.   H. E. HEATH ET AL   2,019,853
COMBINED TOOL BOX AND FOOT REST
Filed Aug. 14, 1934
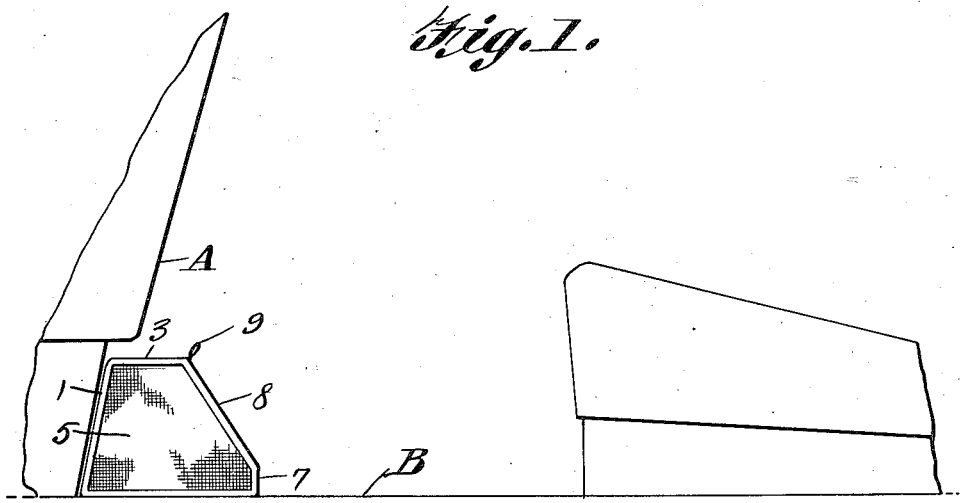
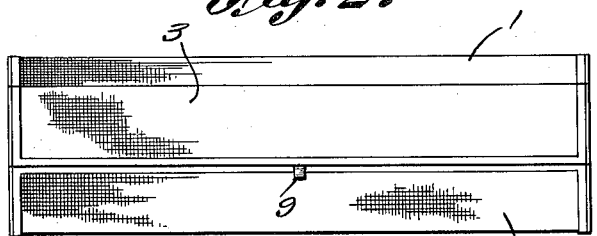
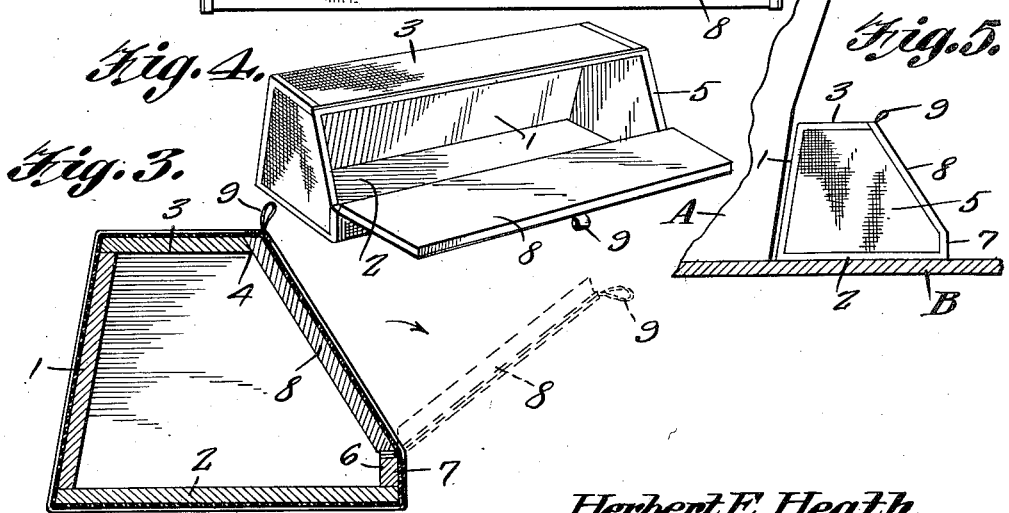
Herbert E. Heath,
George W. Moore,
INVENTORS
BY Victor J. Evans & Co.
ATTORNEY
WITNESS:

Patented Nov. 5, 1935

2,019,853

UNITED STATES PATENT OFFICE 2,019,853

COMBINED TOOL BOX AND FOOT REST

Herbert E. Heath and George W. Moore, Butte, Mont.

Application August 14, 1934, Serial No. 739,788

2 Claims. (Cl. 217—5)

This invention relates to storage receptacles and its general object is to provide a combined tool box and foot rest that is primarily designed for motor vehicles, to be arranged on or secured to the floor of the rear or front compartments of an automobile and preferably in the rear compartment directly to the rear of the front seat so as to not only take up minimum space, but to be in convenient reach of the occupants of the rear seat to act as a foot rest therefor.

A further object of the invention is to provide a combined tool box and foot rest that takes the place of the usual rod type foot rest now generally employed, yet is in the form of a receptacle for the storage of tools, articles and the like, and ready access may be had thereto, due to the manner of arranging the cover thereof.

Another object of the invention is to provide a combined tool box and foot rest that is neat in appearance, simple in construction, inexpensive to manufacture, easy to install and extremely efficient in use and service.

This invention also consists in certain other features of construction and in the combination and arrangement of the several parts, to be hereinafter fully described, illustrated in the accompanying drawing and specifically pointed out in the appended claims.

In describing our invention in detail, reference will be had to the accompanying drawing wherein like characters denote like or corresponding parts throughout the several views, and in which:

Figure 1 is a view illustrating the application of my receptacle in the rear compartment of an automobile.

Figure 2 is a top plan view of the receptacle per se.

Figure 3 is a vertical sectional view taken therethrough, with the cover in closed position in full lines and in open position in dotted lines.

Figure 4 is a perspective view thereof.

Figure 5 illustrates the application of the receptacle with respect to a front seat that differentiates slightly from that shown in Figure 1.

Referring to the drawing in detail, the letter A indicates a front seat of an automobile of the overhanging type to illustrate the application of our receptacle with respect thereto, and B the floor of the rear compartment, to which our receptacle may be secured, or merely disposed to rest thereon, but in any event is arranged in close proximity to the rear of the front seat so as to be in convenient reach of the occupants of the rear seat to act as a foot rest therefor, as clearly shown in Figure 1.

The receptacle includes an inclined rear wall 1 to follow the shape of the rear wall of the front seat as shown, and the rear wall has secured thereto a bottom wall 2, as well as a top wall 3 which is relatively narrower than the bottom wall and has a beveled forward edge 4 to be disposed flush with the inclined forward edges of the side walls 5, the latter being provided with vertical portions 6 at their lower ends to which is secured a relatively narrow front wall 7.

Hingedly secured to the front wall 7 to contact the inclined portions of the side walls 5 and the beveled front edge 4 of the top wall, is a lid or cover 8 which when arranged in closed position as shown in full lines in Figure 3 is inclined to provide a foot rest for the occupants of the rear seat as previously set forth, and the cover has secured thereto a strap 9 that acts in the capacity as a handle for opening and closing the same, as will be apparent.

In Figure 5 we have illustrated our receptacle associated with the back of a rear seat that does not include an overhanging portion, and we have illustrated the same accordingly to bring out the fact that our receptacle can be associated with various types of front seats.

The receptacle may be made of any material suitable for the purpose, and covered with any material such as fabric or leather to match the upholstery and carpet of the vehicle, and of course the edges may be reinforced by any suitable material.

From the above description and disclosure of the drawing, it will be obvious that we have provided a combined tool box and foot rest that can be easily and expeditiously applied to or arranged in an automobile for disposal in the front or rear compartments thereof, and preferably in the latter as shown, and while the receptacle is of elongated formation, with a view of fitting the width of the compartments, it is sufficiently short so as to not interfere with persons entering or leaving the same. When disposed in the front compartment, it will of course be arranged against the front of the front seat, so as to not interfere in any way with the driving or operation of the vehicle or comfort of the passengers and still serve as a tool box and receptacle for other articles.

It is thought from the foregoing description that the advantages and novel features of our invention will be readily apparent.

We desire it to be understood that we may make changes in the construction and in the combination and arrangement of the several parts, provided that such changes fall within the scope of the appended claims.

What we claim is:

1. A receptacle comprising a forwardly inclined rear wall, a relatively wide bottom wall, a relatively narrow top wall having a beveled forward edge, side walls having rearwardly inclined forward portions, a narrow front wall and a cover hingedly secured to the upper edge of the front wall and received by the beveled edge and inclined portions of the side walls to be disposed at an inclination toward the rear wall to provide a foot rest.

2. A combined box and foot rest for a motor vehicle for disposal in the rear compartment thereof, and comprising a rear wall inclined to follow the shape of the front seat of the vehicle, a relatively wide bottom wall, a relatively narrow top wall having a beveled forward edge, side walls having their forward edges inclined for a portion of their length, a very narrow front wall, a lid hingedly secured to the front wall and received by the inclined portions and beveled edge for disposal at an inclination toward the rear wall to act as a foot rest for the occupants of the rear seat of the vehicle, a handle for the lid, and material disposed about the box and lid to act as covering means therefor.

HERBERT E. HEATH.
GEORGE W. MOORE.